United States Patent [19]
Denis et al.

[11] 3,787,657
[45] Jan. 22, 1974

[54] APPARATUS FOR MANUFACTURING SANDWICH PANELS

[75] Inventors: Jean Francois Denis, Lesigny; Serge Yvan Ozalba-Lyndis, Villejuif; Maurice Henri Louis Fremont, Clamart; Edward Krajewski, Yerres; Jean-Pierre Julien Marcel, Morland, Clamart, all of France

[73] Assignee: Societe Nationale Industrielle Aerospatiale, Paris, France

[22] Filed: Mar. 2, 1973

[21] Appl. No.: 337,422

[30] Foreign Application Priority Data
Mar. 3, 1972  France .................... 7207583

[52] U.S. Cl. ......... 219/117 HD, 29/472.3, 219/127, 219/134
[51] Int. Cl. ............................................. B23k 9/02
[58] Field of Search. 219/117 HD, 117 R, 127, 131, 219/134, 136, 87, 137; 29/428, 429, 457, 472.3, 482

[56] References Cited
UNITED STATES PATENTS
2,866,075 12/1958 Pappeleudam ............... 219/117 HD
3,449,543 6/1969 Sciaky .................... 219/131
3,286,074 11/1966 Lehneat et al. ............ 219/131
3,299,249 1/1967 Sciaky .................... 219/127
3,062,950 11/1962 Chyle ..................... 219/127
3,242,309 3/1966 Anderson ................. 219/130 X FOREIGN PATENTS OR APPLICATIONS
1,401,195  1965  France

*Primary Examiner*—Bruce A. Reynolds
*Attorney, Agent, or Firm*—Karl W. Flocks

[57] ABSTRACT

A welding machine for fabricating metal sandwich panels having corrugated core, comprising a set of rules for offering up the core, TIG welding blowpipes positioned in a channel at the location where the core is covered with skin strip, HF-ignition welding generators, HF generators in immediate vicinity to the blowpipes, a weld sequencing block, said machine being disposed in order that the core strip is covered subsequent to being corrugated and is then welded beneath the TIG welding blowpipes, electrodes being positioned outside the core.

14 Claims, 9 Drawing Figures

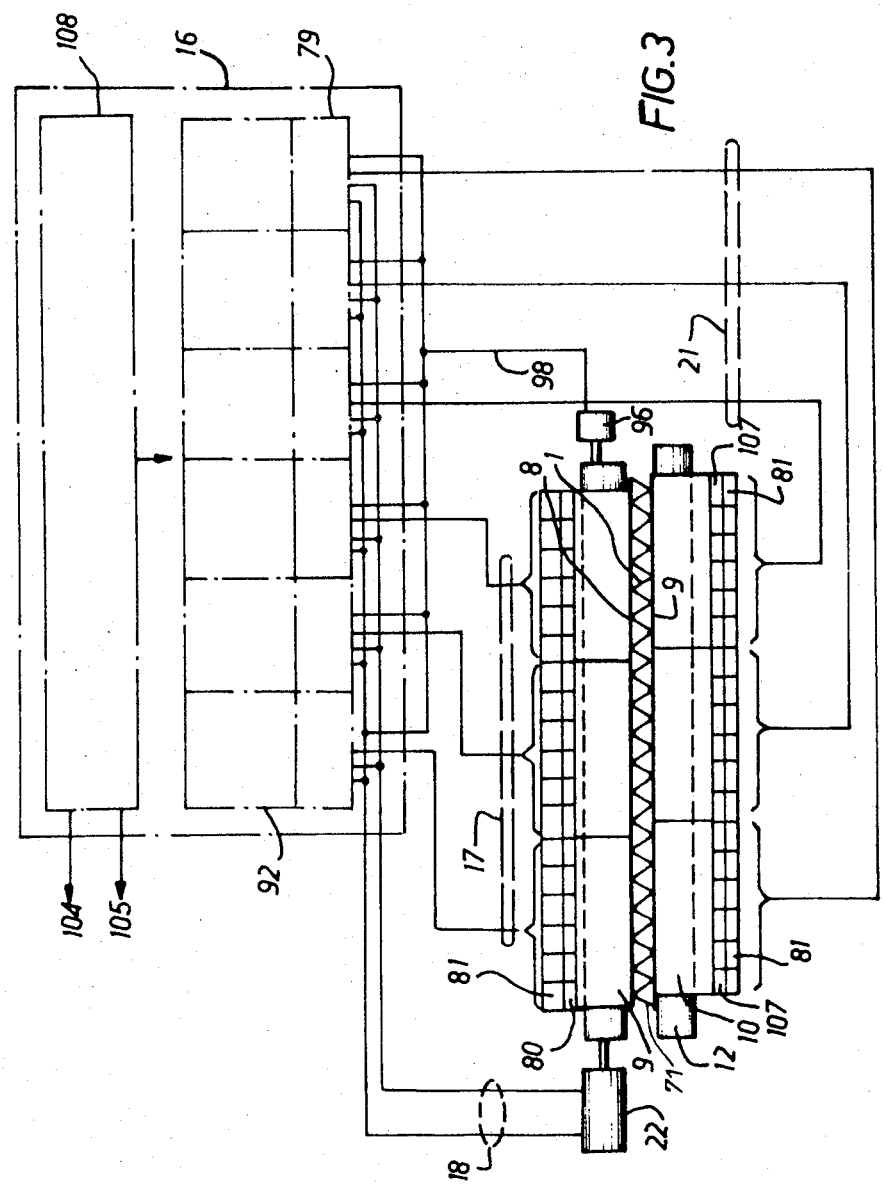

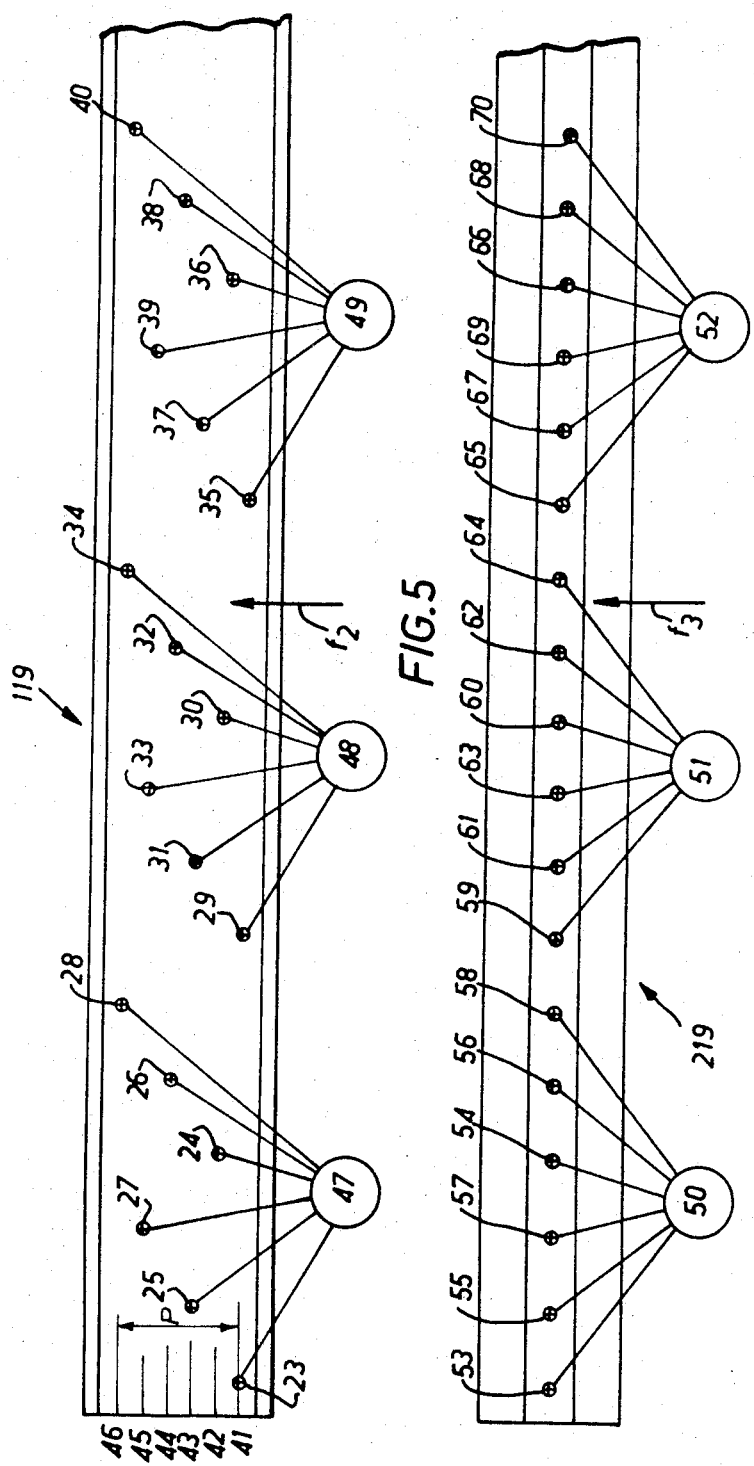

APPARATUS FOR MANUFACTURING SANDWICH PANELS

The present invention relates to apparatus for manufacturing sandwich panels of the kind in which a core consisting of one or more corrugated sheets is covered on one or both sides with a flat sheet attached thereto by convenient securing means.

The conventional industrial method of manufacturing such panels consists in continuously paying out one or more sheets which, subsequent to shaping of the corrugations, form a corrugated core which is then covered with one or two sheets paid out continuously from a position upstream of appropriate securing means.

This known production method is described in U.S. Pat. No. 2,406,051.

The securing method may be by glueing or bonding in the case of certain materials, but metallic materials are preferably joined by welding in order to ensure that the assembly possesses the greatest possible mechanical strength.

A securing method of this kind is described in U.S. Pat. No. 2,302,949.

However, while the quickest welding method is in many cases resistance welding and preferably seam welding, fabrication difficulties arise in the case of corrugated sandwich panels with two outer coverings owing to the fact that welding back-electrodes must be positioned inside the corrugated core itself, as described in French Pat. No. 1,146,056.

Having developed the TIG (Tungsten Inert Gas) spot arc-welding technique for very thin metal sheets in accordance with their French Pat. No. 1,401,195, the Applicants have transposed this technique to the continuous manufacture of sandwich panels by circumventing the aforementioned prior art difficulties relating to the back-electrodes in the core.

The present invention accordingly provides a method of continuously manufacturing sandwich panels, and apparatus for making such panels.

Although all TIG-type welding equipment, including in particular static generators with transformers, can be used within the scope of this invention, the preferred form of embodiment of the invention includes a rotary generator set with a separate excitation circuit, in accordance with the Applicant's above-mentioned patent.

The reason for this preference stems from the fact that arc fade in the case of such rotary generators with separate excitation obeys a law which is particularly favourable for the welding of thin metal sheets, whereas this is not usually the case with commercially available generators.

It is lastly a particular teaching of this invention (intended firstly to reduce the number of welding generators, and secondly to produce judiciously located weld spots in order to distribute the stresses and heat-induced deformations through the panels) that the welding blowpipes are ignited in a programmed sequence as the panel moves past them continuously or intermittently.

The apparatus according to this invention basically includes strip payout reels for the cores and coverings, a corrugation-forming station, a set of core delivery rakes, TIG arc-welding electrodes positioned in channels, a set of supporting and driving rolls, welding generators, HF generators, a sequencing electrical unit, circuits for blowing an inert gas and for cooling the electrode channels, and all control and monitoring means customarily used with apparatus of this kind.

The operating principle of this apparatus is such that the strip used to form the core passes through the forming station, usually of the pressure roll type, and is then covered as it advances by the covering sheet or sheets downstream of the delivery rakes, after which the welding operation is carried out immediately on exit from the rakes and results in uniting of the core and the sheet or sheets to form the completed sandwich panel. Additional rolls are provided to move and restrain the panel during its fabrication.

Further, by virtue of a programmed igniting of the electrodes by high frequency current, the welding generators provide sequential spot-welds on the continuously or intermittently transiting panel.

The description which follows with reference to the accompanying non-limitative exemplary drawings will give a clear understanding of how the invention can be carried into practice.

In the drawings:

FIG. 1 diagrammatically illustrates in perspective an apparatus for manufacturing a sandwich panel according to this invention;

FIG. 3 is an electrical block diagram showing the connections between certain parts in FIG. 2 and the control cabinet;

Figure 9:
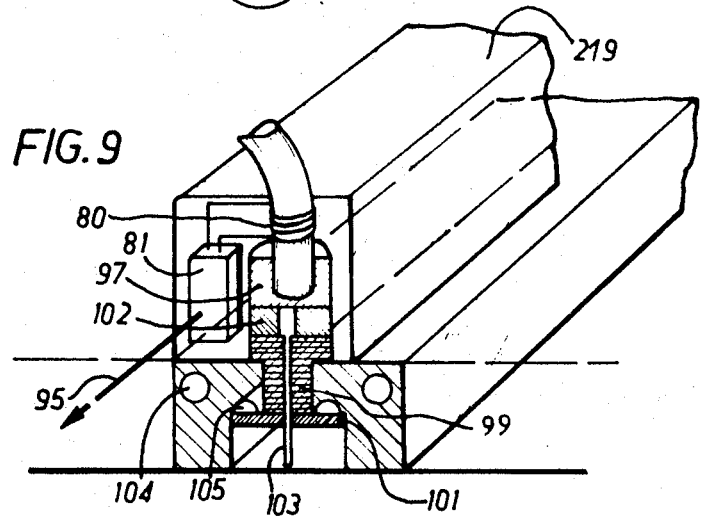
Figure 7:
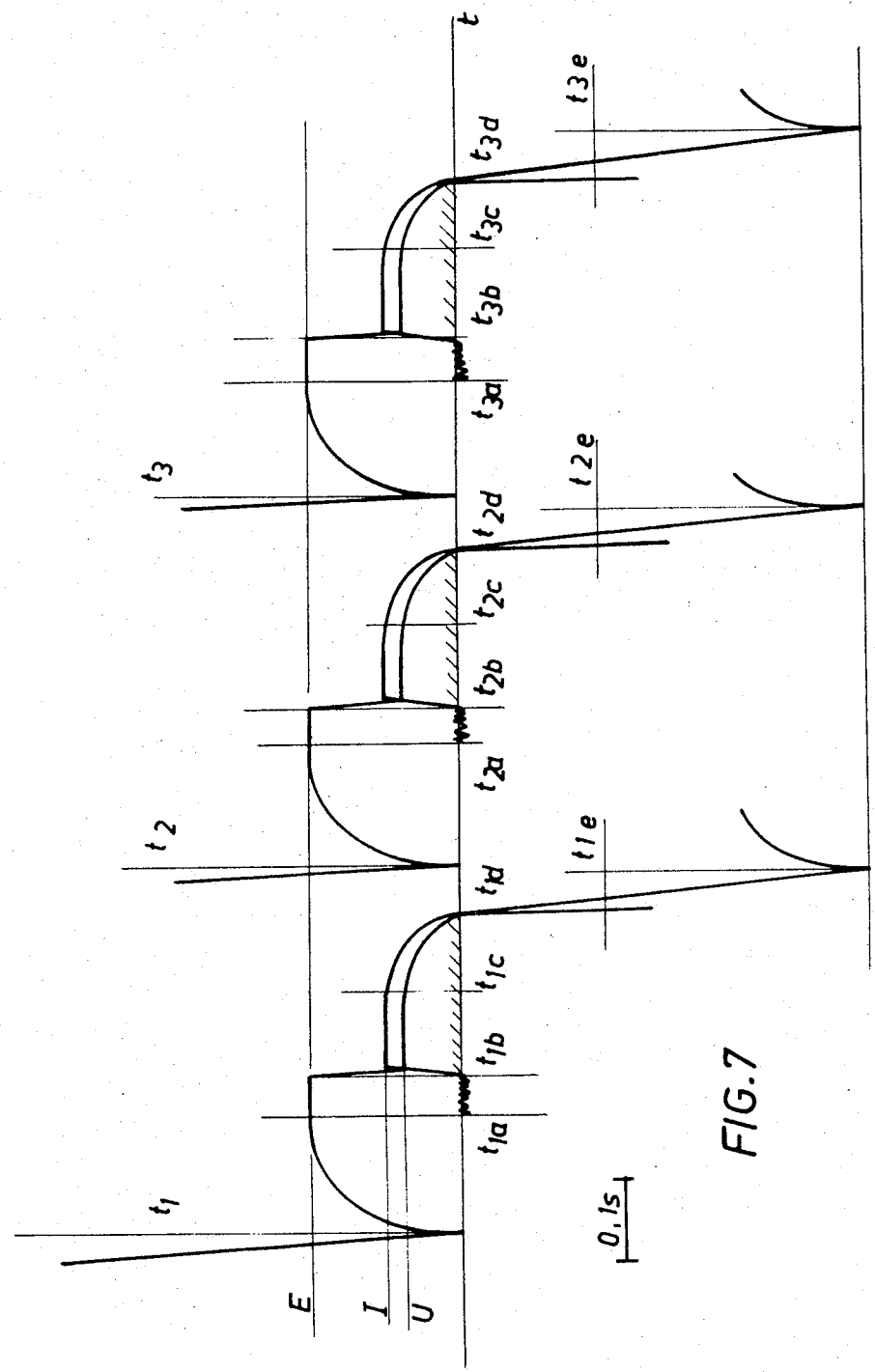
Figure 8:
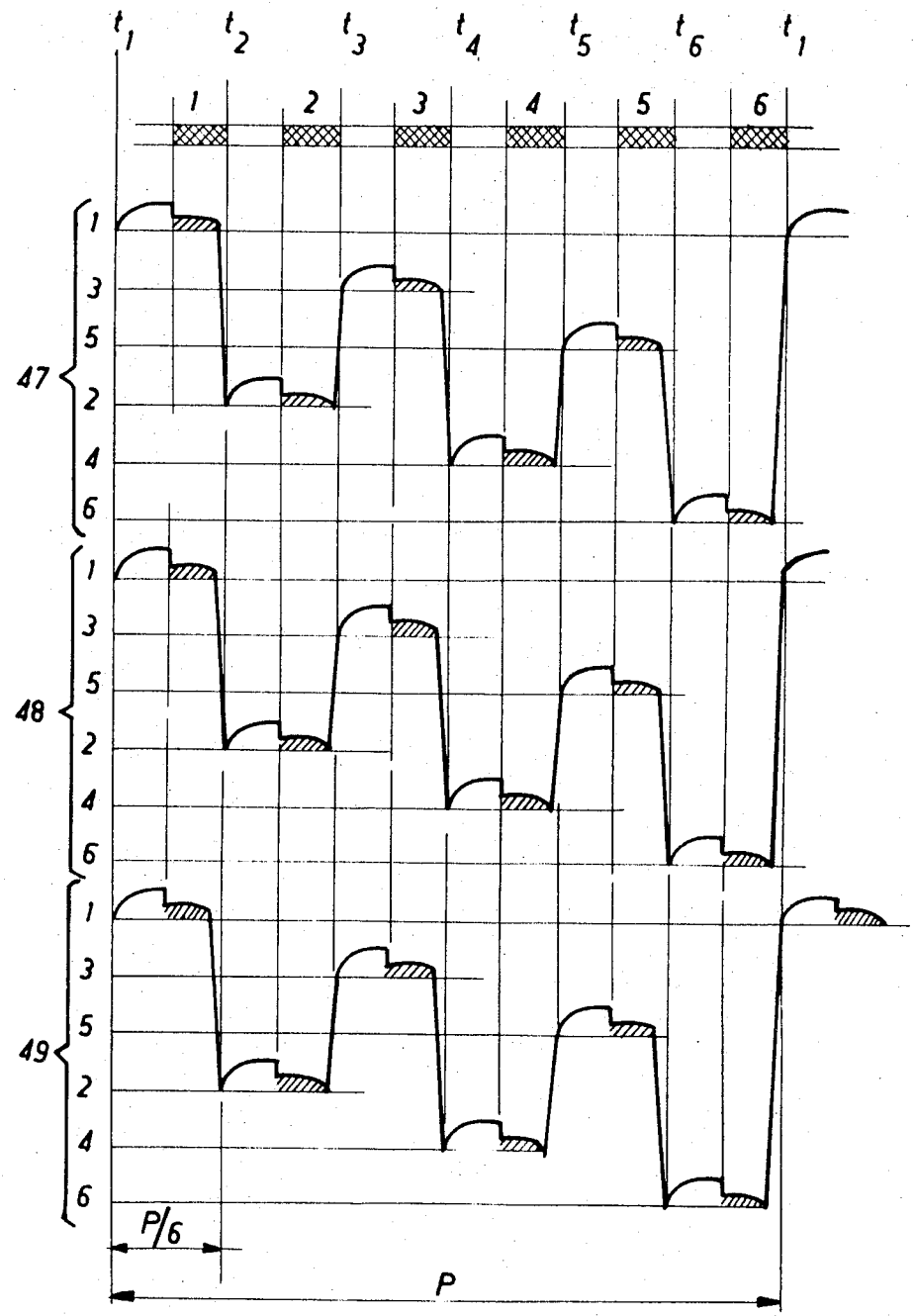

FIGS. 5 and 6 schematically depict the electrode-igniting sequences in the case of sandwich panels transiting continuously and intermittently, respectively;

FIG. 7 graphically portrays the arc igniting and extinguishing law for a welding sequence according to the preferred embodiment of this invention;

FIG. 8 graphically depicts the welding sequence for a set of three generators with six electrodes, each devised in accordance with the preferred embodiment of the invention; and FIG. 9 is a diagrammatic part-sectional view of a welding channel, taken level with an electrode and its HF generator.

Figure 1:
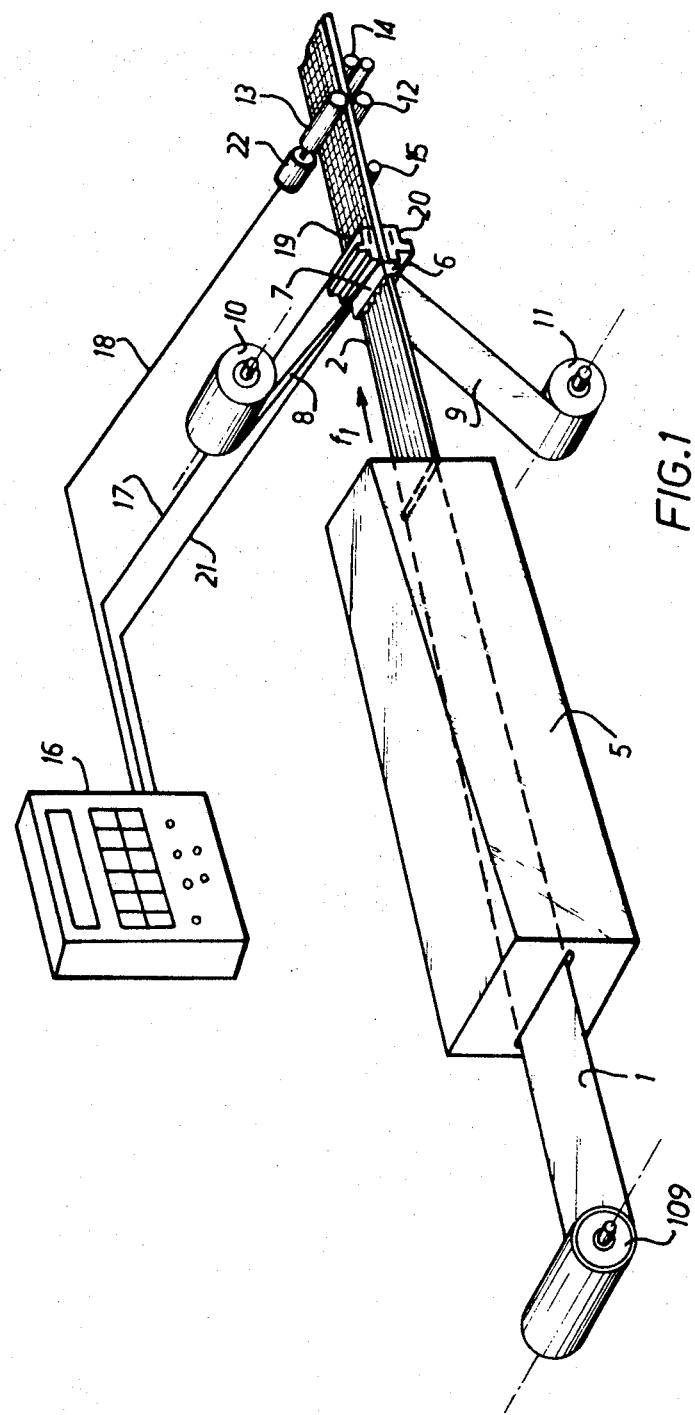

Referring first to FIG. 1, there is shown thereon a strip 1 for forming the corrugated core 2 of a sandwich panel being unwound from a spool 109 and passing through a corrugating block 5 from which it issues in corrugated form before running between two rules or rakes 6 and 7 prior to being covered with two skin sheets 8 and 9 paid out by two spools 10 and 11 respectively.

Corrugating block 5 may be of any convenient type and notably of a type known per se and utilizing shaping rolls.

The core 2 with its coverings then travels in the direction of arrow f1, between the welding channels 19 and 20, and the compound is driven by rolls 12 and 13 while further rolls 14 and 15 support the panel.

A control cabinet 16 supplies electric current and the welding sequence commands through cables 17, 18 and 21.

Figure 2:
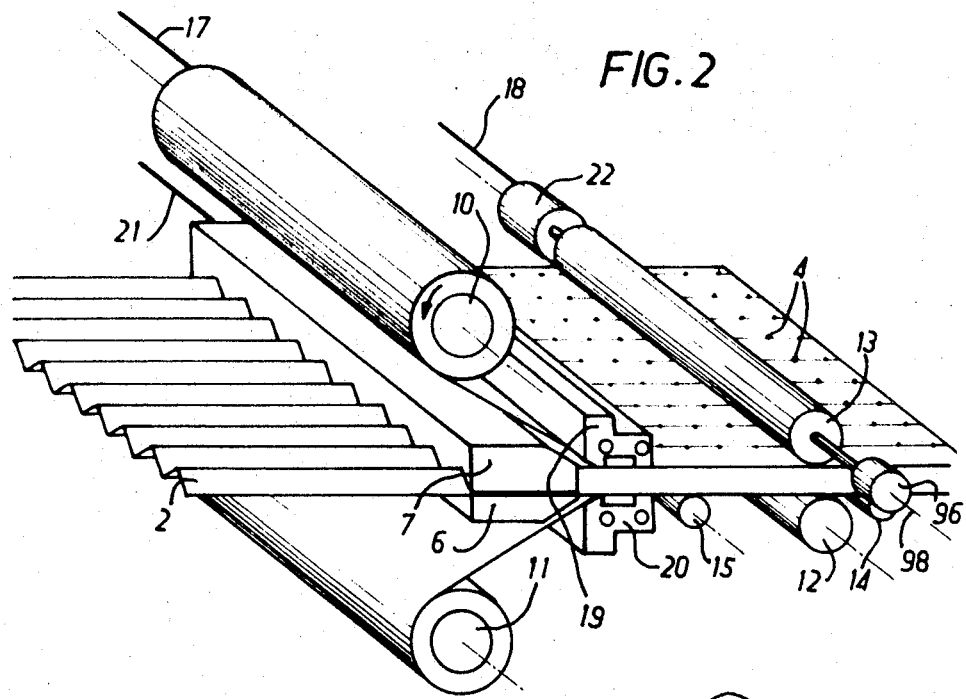
FIG. 2 shows on an enlarged scale a detail of FIG. 1.

FIG. 2 shows on an enlarged scale a detail of this active portion of the apparatus, and it may be seen that the sandwich panel secured at weld spots 4 is continuously discharged towards the exit by the rotation of roll 13 driven by a motor 22.

Referring next to FIGS. 5, 6 and 9, it can be seen that the welding channels 19 and 20 can be provided in either of two arrangements depending on the sequential welding mode adopted.

In a first mode shown in FIG. 5, in which the welding is effected with the sandwich panel moving continuously in the direction of arrow f2, i.e., without stopping, the welding electrodes 23 to 28, 29 to 34 and 35 to 40 are so staggered as to make is possible, by forming six rows thereof over a pitch distance P, designated 41 through 46 in FIG. 5, to obtain, by successively energizing the blowpipes of rows 41, 42, 43, etc., in that order, in conjunction with welding generators 47, 48 and 49, a succession of three weld spots in each row, or a total of 18 weld spots 4 for each pitch distance P travelled by the panel.

This welding mode is to be preferred whenever it is desired to fraction the blisters associated to the weld shrinkage at each spot, so as to obtain a flat, properly stress-balanced panel. Manifestly, the disgrammed arrangement represents the disposition of the electrodes in channel 119, and obviously the facing channel 120 bears identically arranged welding electrodes for the other skin panel.

In an alternative mode shown in FIG. 6, in which the welding is effected with intermittent motion in the direction of arrow f3, welding electrodes 53 through 70 are arranged in a single row, and the generators have their associated electrodes ignited simultaneously in the numerical order shown in the figure Thus welding generators 50, 51, 52 simultaneously energize electrodes 53, 59, 65, followed by 54, 60, 66 and so on up to electrodes 58, 64, 70, while the panel is arrested in the course of its travel.

FIG. 6 shows an aligned arrangement of the electrodes along a channel 219, and the facing channel 220 bears the blowpipes for welding the other skin panel in an identical alignment.

Figure 4:
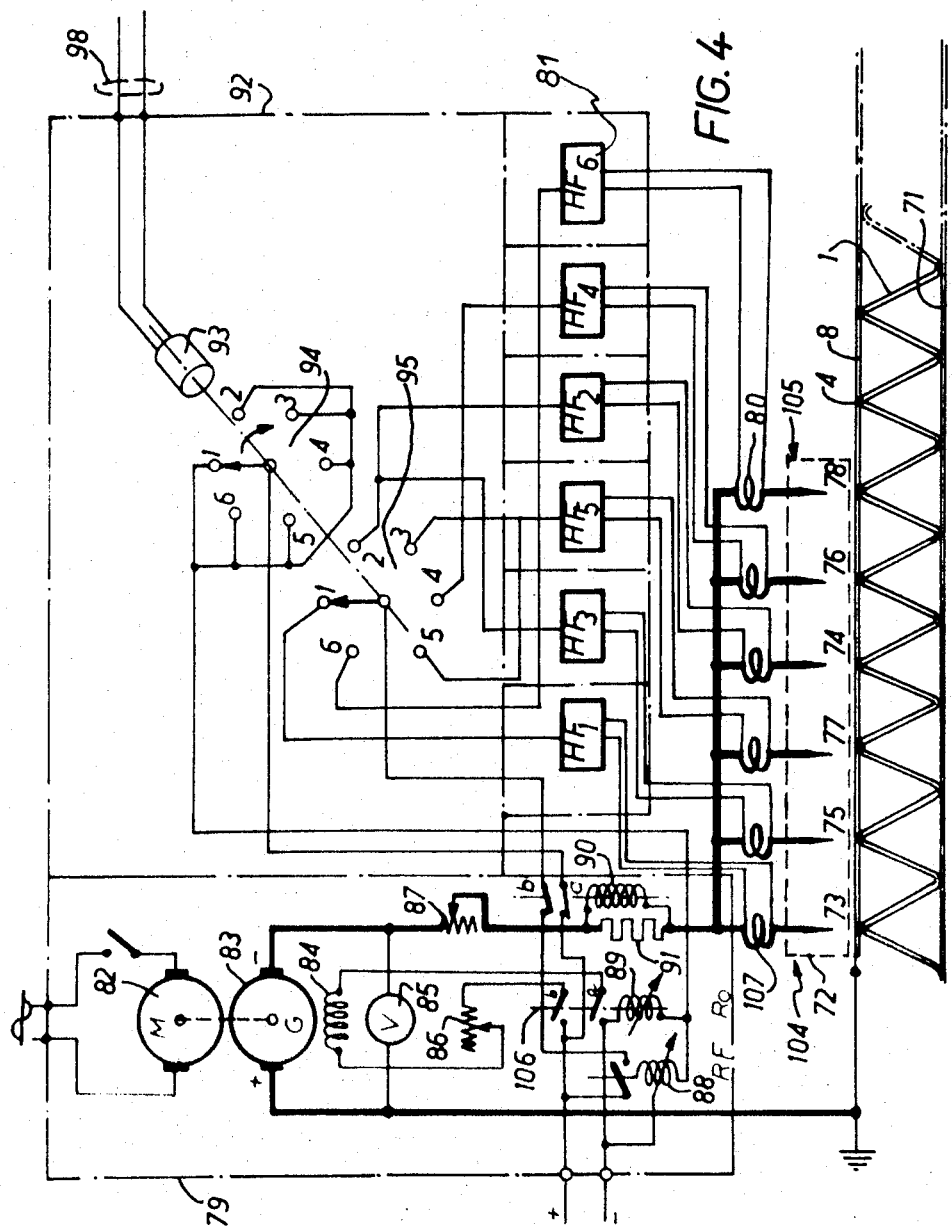
FIG. 4 is a more detailed electric circuit diagram showing the welding and electrode-igniting circuits of FIG. 9.

With regard to the welding period proper, and in accordance with the preferred welding method of the invention using a rotary set with separate excitation, FIGS. 3, 4 and 7 show how this specific welding cycle is performed and the means for carrying it into practice.

FIG. 3 shows a sandwich panel 71 which is about to be completely welded, for instance by two sets of three electrode-supporting channels similar to channel 72 (FIG. 4), or else by two channels treble those just mentioned. Each unit channel element receives six electrodes 73 to 78 connected in parallel into the circuit of a welding generator 79 and six HF coils 80 connected into the feed circuit of each electrode 73 through 78. Each coil 80 is connected to an HF generator 81 positioned close to the blowpipe in such manner as to make the electrical connections as short as possible.

As shown in FIG. 4, each welding generator basically includes a generator driving motor 82 with a generator 83 excited by a field magnet 84, and a voltmeter 85 monitors the electromotive force produced, the value of which is adjusted by a variable resistor 86, while another variable resistor 87 controls the welding current proper. A switch is provided for switching the system on or off.

Each welding generator additionally comprises two time-delay relays 88 and 89, and a relay 90 is connected to the terminals of a shunt 91 in order to react as soon as the current delivered by the generator appears.

Each welding generator is furthermore completed by a sequencing block 92 which includes a stepwise motor 93 driving two six-way selectors 94 and 95, the drive commands to this motor being given by a panel motion detector 96 over a connecting cable 98.

The electrode-supporting channel system shown in detail in FIG. 9 by way of example, in a configuration of aligned electrodes such as 219 and 220 includes, in addition to the current supplying cable, a cable connecting terminal 97, an insulating body 99, a porous plate 101 and a clamping system 102.

The tungsten electrode proper, 103, can readily be replaced if necessary by means of an interchangeability device (not shown).

A water circulation duct 104 and an argon circulation duct 105 are provided to cool the channel and to confine the gas in the manner required in this type of welding.

The channel with aligned electrodes shown in FIG. 9 is identical in principle to the channel with non-aligned electrodes used for welding a continuously transiting panel.

The welding sequence proper, represented by the graphs in FIG. 7 and which can be followed on the diagram in FIG. 4, takes place as follows:

Once the switch is closed, motor 82 continuously drives the generator 83, which is not yet excited since the contacts 106a and 106b of relay 89 are open. If it is assumed that the sequence begins at the instant when the stepwise motor 93 switches contact stud 1 of contact ring 94, then relay 89, opening of which is time-delayed, will trip in and excitation of the generator will begin at the instant $t1$ (or $t2, t3, t4, t6$ for the other generators) through a building-up of the electromotive force at E in the welding circuit, since the arc has not yet struck. At instant $t1a$ ( or $t2a$ through $t6a$), by virtue of the closure-delayed relay 88, block HF1 will be energized concurrently through contacts 88, 90b and contact stud 1 of contact ring 95.

Via coil 107, block HF1 generates a high frequency current in the welding circuit until electrode arcing takes place at $t1b$ (or $t2b$ through $t6b$). At the very instant $t1b$ when the arc ignites and a welding current of voltage U and intensity I appears, the relay 90 is energized and cuts off the HF supply via 90b and the supply to relays 88 and 89 via 90a.

The welding time, represented by the time interval $t1c,t1b$ is adjusted by the opening time-delay in relay 89 which, upon tripping, cuts off the generator excitation at $t1c$ (or $t2c$ through $t6c$).

From instant $t1c$ onwards, arc fade obeys a predetermined law that depends on the prior setting of resistors 86 and 87, whereby when the instant $t1d$ (or $t2d$ through $t6d$) is reached the generator is no longer excited.

By way of example, a welding cycle sequence may be broken down as follows (referring to the plots in FIG. 7):

| | |
|---|---|
| Generator voltage build-up | $t1a-t1=6/10''$ |
| HF pulse | $t1b-t1a=1/10''$ |
| Welding | $t1c-t1b=1/10''$ |
| Arc fade | $t1d-t1c=1/10''$ |
| Switching | $t1e-t1d=1/10''$ |
| Total | $10/10''=1$ second |

Throughout the cycle time, when detector 96 registers a shift P/6 of the panel, it sends a command over cable 98 to stepwise motor 93 to switch to position "2" in order to allow another cycle to take place.

The overall welding sequence is manifestly applicable to all generators, and it portrayal in FIG. 8 clearly shows that each generator can, by a switching process, effect a set of six weld spots when the panel moves by an amount P.

Thus if the welding cycle time is taken as one second, and assuming a pitch $P$ of 40 mm, and with the three generators feeding each of the two welding channels, it will be possible for them to attach the skin sheets to the core at the rate of $[1,000 \text{ mm} \times (1 \text{ sec} \times 6)]/40 \text{ mm} = 150$ inches for 1,000 mm, or approximately 0.4 metres per minute.

It is to be noted that panel motion during the welding operation proper has no effect on the quality of the spot weld by reason of its small magnitude, which in the above cited case would be less than 1.2 mm.

In the alternative embodiment with intermittent panel travel during the welding, the operations take place in similar manner, except that stepwise motor 93 completes one full revolution during each interruption in panel motion. The panel motion detector and the drive motor are obviously adapted accordingly.

Located in cabinet 16 is a block 108 in which are grouped all the control and monitoring electrical ancillaries both for overall operation of the machine and for the welding phase, along with the channel cooling circuit and the gas circuit. Being already known per se, this block will not be described in further detail.

It goes without saying that changes and substitutions of parts may be made in the preferred exemplary embodiment hereinbefore described, without departing from the scope of the invention as set forth in the appended claims. More specifically, the subject manufacturing method of this invention is applicable to all metals, and notably to steels, in any compatible thickness and with any number of cores and corrugation modulus thereof. Such a semi-finished material is commercially known by the name "Norsial", a trademark registered by the Applicant.

We claim:

1. A machine for welding coating skin strips onto a core in the manufacturing of metal sandwich panels having a corrugated core, comprising strip payout reels for said coating skin strips; a strip payout reels for said core; a corrugation-forming station adapted to be supplied by said core and to form a corrugated core and to drive it towards a set of rules adapted to offer up said core to said coating skin strips; TIG welding blowpipes placed as channels to the outside of said coating skin strips at a location where the welding of said coating skin strips is carried out on said corrugated core; said welding blowpipes being supplied by an arc-welding rotary generator set with HF generators located in the immediate proximity to said blowpipes which are ignited by a welding sequencing block provided with a switching circuit; an inert-gas blowing circuit and a coolwater circuit for protecting the welding area and the blowpipes, the machine being so disposed that the core strip is covered subsequent to being corrugated and is then welded beneath the TIG welding blowpipes.

2. A welding machine according to claim 1, in which the blowpipes are positioned in staggered configuration outside the panel, which panel travels with a continuous motion.

3. A welding machine according to claim 2, in which the switching circuit includes a detector for detecting travel of an intermittently transiting panel, said detector being connected to a stepwise motor which effects switchings on said contact-rings in a predetermined order and in successive phases dependent on welding cycle time.

4. A welding machine according to claim 1, in which the blowpipes are transversely aligned outside the panel, said panel travelling in an intermittent motion.

5. A welding machine according to claim 1, in which the weld sequencing block includes a generator continuously driven by a motor, a generator excitation circuit having a coil and an electromotive force adjusting resistor connected thereinto, a welding circuit comprising a current adjusting resistor, a shunt and at least two tungsten electrodes, a normally-closed relay across shunt's terminals controlling contacts in the switching circuit and in HF excitation circuit, a delayed-opening relay controlled by the switching circuit, contacts of which control excitation of the generator, a closure-delayed relay controlled by the switching circuit, contact of which is connected into the HF control circuit, whole unit being such that when the opening-delayed relay (OD) and the closure-delayed relay (CD) are energized by the switching circuit, the OD relay closes and excites the generator whereupon same delivers a voltage so long as the arc has not struck, after which, as soon as potential becomes stable, the CD relay closes and in turn energizes the HF generator selected by the switching circuit whereby to allow corresponding arc to strike and cause opening of corresponding shunt relay which in turn closes the switching circuit acting upon the OD and CD relays thereby to cause said relays to being about, after a time predetermined by time delay of OD, arresting of generator excitation and start of arc fading, law of which being determined by the values of the adjustable resistors, and cutting-off of the supply to selected HF generator.

6. A welding machine according to claim 5, in which the switching circuit and the HF excitation circuit include a stepwise motor with shaft of which are angularly rigid two switching contact-rings, one of which controls the sequence times for energizing the OD and CD relays and other selects power supply to the HF generators, said stepwise motor being in turn governed by a panel motion detector.

7. A welding machine according to claim 1, in which the switching and HF control circuits are governed by means commanded by the motion of the panel beneath the welding electrodes.

8. A welding machine according to claim 6, in which the switching circuit includes a detector of the motion of a continuously transiting panel, said detector being connected to a stepwise motor for effecting switchings in a predetermined order at points in time dependent on welding pitch distance and number of blowpipes.

9. A welding machine according to claim 1, in which the welding blowpipes are positioned in their channel with a transverse spacing therebetween dependent on corrugation pitch and a longitudinal spacing dependent on the welding pitch distance, the blowpipes being ignited in a predetermined order by the switching circuit.

10. A welding machine according to claim 9, in which the switching circuit includes a detector of the motion of a continuously transiting panel, said detector being connected to a stepwise motor for effecting switchings in a predetermined order at points in time dependent on the welding pitch distance and the number of blowpipes.

11. A welding machine according to claim 1, in which the welding blowpipes are aligned along their channel with a transverse spacing therebetween dependent on the corrugation pitch, said blowpipes being ignited in a predetermined order by the switching circuit.

12. A welding machine according to claim 1, in which the channels which receive the tungsten electrode blowpipes include a cooling circuit, a gas circuit passing through a porous plate, an HF current induction coil on each electrode energizing means, a HF generetor for each induction coil and means for insulating and rapidly positioning the blowpipes.

13. A welding machine according to claim 1, in which a set of rolls drives the panel undergoing manufacture and a detector for detecting motion of the same is angularly rigid with a drive roll.

14. A welding machine according to claim 1, in which support rolls are positioned beneath the panel on either side of the drive rolls.

* * * * *

UNITED STATES PATENT OFFICE
CERTIFICATE OF CORRECTION

Patent No. 3,787,657         Dated January 22, 1974

Inventor(s) Jean Francois DENIS, Serge Yvan DZALBA-LYNDIS, Maurice Henri Louis FREMONT, Edward KRAJEWSKI and Jean-Pierre Julien Marcel MORLAND It is certified that error appears in the above-identified patent and that said Letters Patent are hereby corrected as shown below:

Title page, left column, under "Inventors" the name of the second inventor should read

SERGE YVAN DZALBA-LYNDIS and the name of the last inventor should read

JEAN-PIERRE JULIEN MARCEL MORLAND

Signed and sealed this 23rd day of April 1974.

(SEAL)
Attest:

EDWARD M.FLETCHER,JR.
Attesting Officer

C. MARSHALL DANN
Commissioner of Patents